United States Patent [19]

Meister

[11] Patent Number: 4,722,321

[45] Date of Patent: Feb. 2, 1988

[54] APPARATUS FOR THE HEAT TREATMENT OF FOODS OR MEALS WITH A SENSOR TUBE

[76] Inventor: Siegfried Meister, Siemensstr. 2, 8910 Landsberg/Lech, Fed. Rep. of Germany

[21] Appl. No.: 760,882

[22] Filed: Jul. 31, 1985

[30] Foreign Application Priority Data

Aug. 4, 1984 [DE] Fed. Rep. of Germany ....... 3428792
May 22, 1985 [EP] European Pat. Off. ........ 85106278.6

[51] Int. Cl.⁴ .............................................. A21B 1/08
[52] U.S. Cl. .................................. 126/20; 126/21 A; 126/369; 99/330; 99/447; 99/474
[58] Field of Search ...................... 126/369, 369.1, 348, 126/20, 374, 21 A, 377, 20.1; 99/330, 339, 446, 447, 331; 426/232, 113, 412, 523

[56] References Cited

U.S. PATENT DOCUMENTS

| | | | |
|---|---|---|---|
| 3,151,850 | 10/1964 | Wellford, Jr. ........................... | 34/50 |
| 3,608,470 | 9/1971 | Zabiyakin et al. ..................... | 99/330 |
| 3,744,474 | 7/1973 | Shaw ..................................... | 126/20 |
| 4,506,598 | 3/1985 | Meister ................................. | 126/20 |

FOREIGN PATENT DOCUMENTS

| | | |
|---|---|---|
| 0092851 | 4/1983 | European Pat. Off. . |
| 2541374 | 3/1977 | Fed. Rep. of Germany . |
| 2731191 | 12/1978 | Fed. Rep. of Germany ...... 126/369 |
| 158428 | 9/1983 | Japan ................................ 126/21 A |
| 2010078 | 6/1979 | United Kingdom . |

*Primary Examiner*—James C. Yeung
*Attorney, Agent, or Firm*—Hill, Van Santen, Steadman & Simpson

[57] ABSTRACT

The invention relates to an apparatus for the heat treatment of foods, particularly for the cooking of meals by means of steam or a steam/hot air mixture with a cooking area and a steam supply regulatable subject to a sensor and with, a sensor tube connecting the cooking area to the ambient being provided.

3 Claims, 5 Drawing Figures

APPARATUS FOR THE HEAT TREATMENT OF FOODS OR MEALS WITH A SENSOR TUBE

BACKGROUND OF THE INVENTION

The invention relates to an apparatus for the heat treatment of foods, particularly for the cooking of meals, by means of steam or a steam/air mixture with a cooking area and a steam supply regulatable subject to a sensor.

Various constructional embodiments of such apparatuses for the heat treatment of foods or meals are known (cf e.g. German Pat. No. 2,731,191 and German Utility Model No. 8,131,827). Normally, in the case of such apparatuses for the purpose of heat treating foods, e.g. for thawing deep-frozen foods, or for cooking meals, i.e. for boiling, baking or roasting purposes, water vapour is introduced into the cooking area and mixes with the air present in the latter or partially displaces the said air.

The steam and steam/air mixtures gives off its heat to the product being cooked, thawed, etc, the steam proportion condensing and the condensate can drain off by means of a steam trap normally issuing in the bottom of the cooking area. The steam "consumed" in this way is sent back into the cooking area by means of the steam supply system. This resupply requirement varies, as a function of the state of the product being cooked, thawed, etc so that it is advantageous to control or regulate the steam supply.

For regulating the steam supply, it has already been proposed (cf German Pat. No. 2,731,191), to fit a heat sensor of a temperature regulator in the steam trap enabling the steam supply to be regulated as a function of the temperature prevailing in the steam trap. An apparatus constructed according to this proposal generally leads to a satisfactory regulation of the steam supply in the cooking area, which permits economic and energy-saving operation. However, such an apparatus is not completely free from disadvantages under all conditions. Thus, at the heat sensor in the steam trap and which is at least partly simultaneously used for draining off fat or gravy running down from the meals, it is also possible for clogging to occur by the fat and gravy being deposited at the location of the heat sensor, so that the latter becomes encrusted. As a result, the measured temperature value is falsified. The steam trap can also partly become clogged as a result of careless operation of the apparatus, overloading of the cooking area or as a result of other circumstances, so that the heat sensor responds with a marked time lag. From the maintenance and cleaning standpoints, the arrangement of the heat sensor in the steam trap is not particularly advantageous, particularly, as is partly provided, the steam trap is subdivided into a condensate removal tube and a fat drain the latter e.g. being coupled by means of a displaceable sleeve to the steam trap. Depending on the heat sensor arrangement, the latter can only be reached with a certain effort, whilst bearing in mind that with increasing flow distance of the heat sensor from the cooking area, the regulation of the actual conditions is subject to an increasingly long time lag.

In view of the aforementioned shortcomings of known apparatuses of the aforementioned time, the problem of the present invention is to so construct and further develop such an apparatus that at any time, even under extreme conditions a reliable and sensitive regulation of the steam supply is possible, preferably accompanied by an improvement to maintenance conditions.

SUMMARY OF THE INVENTION

According to the invention, this problem is solved by a sensor tube connecting the cooking area to the ambient.

Thus, according to the invention, an independent, separate sensor tube is provided for the sensor. Whilst the steam trap must have a not inconsiderable size for receiving the condensate quantities obtained and must be positioned relatively centrally in the cooking area for receiving such condensate quantities and also possibly dripping down liquid fat and food residues, the sensor tube according to the invention can be fitted separately at a point, which is protected from the penetration of condensate, liquid fat or food residues. As the sensor tube according to the invention is only used for temperature measurement purposes, it can optionally be located on a cooking area opening with a dome or the like, which only has a small, possibly undercut opening, so that a penetration of the aforementioned media is effectively prevented.

In the case of penetration of steam or a steam/hot air mixture, the steam or mixture displaces the air in the cooking area by means of the conventionally provided blower and due to the relatively limited space without any significant thermal stratification. In the circumstances, the sensor tube can be positioned in the upper region of the cooking area. In the present context, "upper region" can cover all those regions of the cooking area which do not constitute the base or bottom thereof, i.e. in particular also the side walls and rear walls of said cooking area. Preferably, via the sensor tube, there is simultaneously a direct connection with the ambient. The arrangement of the sensor tube in an upper region of the cooking area does not allow the aforementioned problems of a possible contamination or clogging occur, or only to a considerably reduced extent compared with a bottom arrangement of the sensor tube.

The regulation of the steam supply or the supply of mixture into the cooking area normally takes place in such a way that on reaching a given temperature the steam supply is interrupted, or optionally steam production is stopped, whereupon the steam present in the cooking area continues to give off heat and condenses. Due to the considerable volume change on passing from steam to condensate, this leads to a vacuum in the cooking area, so that cold ambient air is sucked in through the connections between the cooking area and the ambient, i.e. also through the sensor tube according to the invention. As is already described in German Utility Model No. 8,131,827, whose disclosure is completely incorporated into the description of the present invention, the temperature difference thus occurring at the sensor is used for a switching or precise reconnection of the steam supply or production. In this connection, there is also a surprising advantage as a result of an apparatus according to the invention. On fitting the heat sensor in the steam trap, the sucked in ambient air initially flows through a relatively long portion of said steam trap until it reaches the heat sensor. Thus, the ambient air is in heat exchange with the steam trap, so that it heats on flowing in and at least initially the resupply of steam or the reconnection of steam production is not initiated, or the initially inflowing ambient air does not initiate the resupply or reconnection. The sensor tube only provided for the sensor can, however, be made relatively short, so that an additional improvement to the sensitivity of the control can be achieved.

Although therefore it is stated that the sensor tube can be associated with an upper region of the cooking area, which only means that its opening or the sensor tube is only subject to the conditions prevailing in the upper area of the cooking area, according to a specific construction the sensor tube can be arranged in the top surface of the cooking area.

However, as is apparent from the aforementioned teaching and the advantages associated therewith, the invention is in no way limited to arranging the sensor tube in the top surface of the cooking area or being associated with the upper region of said cooking area. The present teaching also extends to an arrangement in the lower region of the cooking area. Although an arrangement in the steam trap where there is a contamination risk is to be avoided, according to a special development, the sensor tube can be positioned in a bypass to the steam trap. Although this does not lead to all the advantages described hereinbefore in connection with a sensor tube directly connected to the ambient, the main disadvantages are overcome which, as stated, are linked with an arrangement of the sensor in the steam trap. Such a construction only requires minor modifications in the present type of apparatus and is consequently also suitable for subsequent fitting or conversion and effectively solves the problems associated with the arrangement of the sensor in the steam trap.

In an arrangement of the present type, particularly as described in German Utility Model No. 8,131,827, apart from the cooking area there is a pressure chamber which is partly separated with respect to the cooking area and which contains a fanwheel blower, optionally with a surrounding heating coil, with which hot air can be produced and the cooking area atmosphere can be circulated, because the suction side of the blower is connected to the cooking area. Thus, a flow forms directly in the cooking area, at least when the blower is operating. To ensure an effective inflow of cold air, according to the invention at least the sensor tube is at right angles to the flow direction prevailing in the cooking area and preferably issues at a shallow angle to said flow direction. Obviously, the opening of the sensor tube is directed in the flow direction and not opposite thereto. This teaching is not only advantageous in the case of an arrangement of the sensor tube in the upper region or in the top of the cooking area, but also in the case of an arrangement of the sensor tube in the bottom of the cooking area, or at some other point.

For effectively regulating the steam production, in order to prevent wrong reactions of the sensor, the invention additionally proposes constructing the sensor tube so that it can shut off, e.g. by means of a valve, slide valve, etc. With such a construction, the invention provides a special control, so that the valve or slide valve in the sensor tube is closed when steam is produced or when steam and/or a steam/hot air mixture flows into the cooking area. As soon as the sensor in the sensor tube reaches a predetermined switching temperature of between 95° and 100° C., the steam supply or production is stopped and the valve or other shutoff device in the sensor tube is opened. Thus, ambient air only flows into the cooking area through the sensor tube, when steam supply is cut off.

The aforementioned cooling, which brings about the inflowing ambient air with the steam supply disconnected leads, after reaching a given, predetermined switching temperature, to the steam production or supply being connected again, so that the shutoff device in the sensor tube is closed again.

It is important for the regulation of the steam production or supply, that the sensor in the sensor tube is subject to the action of cold ambient air. In the case of the normal construction of the present apparatus, on reaching the sensor switching temperature and with the following disconnection of the steam supply, not only is cold ambient air sucked through the sensor tube, but also through the steam trap into the cooking area. Generally, the steam trap has a larger diameter than the sensor tube, i.e. offers less flow resistance to the inflow of ambient air. However, of the purposes here, it is only a question of the tripping of the circuit by the sensor. Ambient air flowing in through the steam trap does not contribute to this and can disadvantageously lead to an undesired cooling of the cooking area atmosphere and to a marked delay in the response of the sensor. In order to provide an improvement here, according to a further development of the invention, the steam trap is constructed so that it can be shut off with respect to the ambient. This can be practically realised in numerous different ways. For example, a shutoff valve can be provided in the steam trap, which can be operated in the same way as the valve in the sensor tube as a function of a given temperature, e.g. 95° to 100° C., but in such a way that it shuts off the steam trap when the valve in the sensor tube opens and vice versa. The opening times of the valve in the sensor tube are relatively short, so that such a short-term shutting off of the steam trap is not prejudicial. This teaching can also lead to a construction such that the steam trap is not only open towards the ambient, but the condensate can be drained off in timed manner via a lock or sluice system or the like.

The present teaching can also be described as follows. In an apparatus of the present type, a lateral or upper wall of the cooking area has an opening leading into a pipe, in which is arranged a sensor coupled to the control device. As the sensor is no longer in contact with the condensate or fat draining out of the cooking area, it can immediately detect a change to a suitable physical parameter linked with the steam saturation of the cooking area and without disturbance by contamination and can indicate same to the control device.

The sensor can preferably be a heat sensor determining the temperature of the medium flowing through the pipe, e.g. the hot air or steam.

Alternatively, it is possible to construct the sensor as a pressure pickup. As long as steam condenses on the meals in the cooking area, there is no significant overpressure in the latter and this only increases if steam condensation on the meals is only of a limited nature and steam passes out of the cooking area via the pipe or tube. The pressure pickup detects the associated pressure rise and indicates this to the control device for correspondingly regulating the boiler heating system.

According to a preferred embodiment of the pressure sensor, the latter is constituted by a pressure pickup or liquid level manometer, which is e.g. functionally coupled via a switch, which determines the liquid level.

According to a further development of the invention, the pipe as a bypass line can issue into the discharge pipe. This makes it possible to construct the sensor as a flowmeter detecting the flow rate of the medium flowing through the pipe. It can be advantageous to provide a restrictor in the discharge pipe, the bypass line issuing into the discharge pipe on the downflow side of the restrictor.

BRIEF DESCRIPTION OF THE DRAWINGS

The invention can be described in greater detail hereinafter relative to non-limitative embodiments and the attached drawings.

DESCRIPTION OF THE PREFERRED EMBODIMENTS

Figure 1:
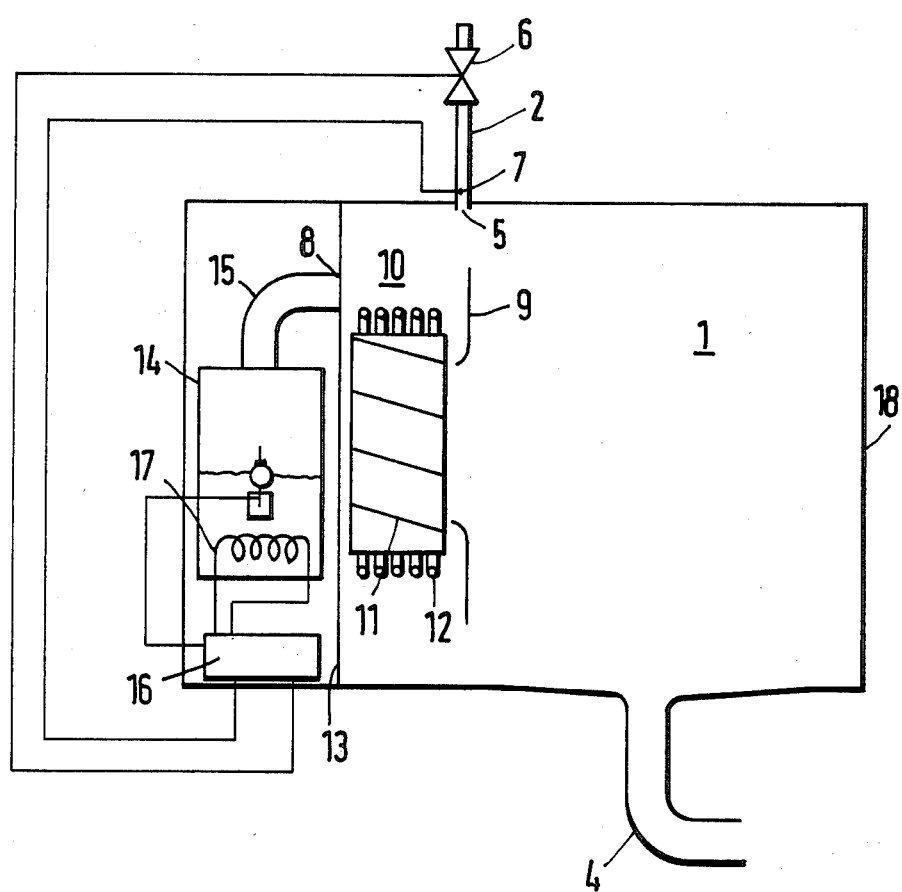
FIG. 1 shows an exemplified embodiment of the invention with the arrangement of the sensor tube in the cooling area top surface.
Figure 3:
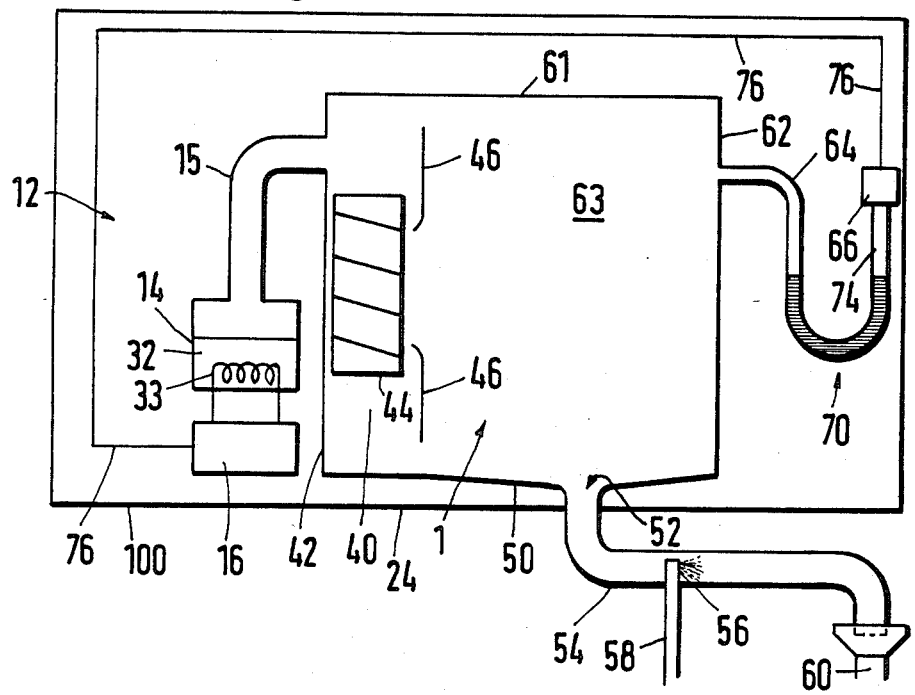
FIG. 3 shows another embodiment according to the invention with a manometer.

In the case of the embodiment of the inventive apparatus shown in FIG. 1, a sensor tube 2 is shown, in which is arranged a sensor 7, close to the cooking area opening 5 of sensor tube 2 the other end of the sensor tube 2 issues directly into the ambient of the present apparatus, said tube also being equipped with a shutoff valve 6.

In addition, the apparatus shown in FIG. 1 has a steam or steam/hot air mixture supply means 8. The steam or mixture flows in the embodiment of FIG. 1 into the upper region of cooking area 1. In the case of the embodiment shown in FIG. 1, the cooking area opening 5 issues substantially at right angles to a flow resulting from the steam supply and/or a circulation of the steam/air mixture. However, as stated hereinbefore, it can also be preferable for the cooking area opening 5 to issue with a small angle with respect to the flow. However, it must be ensured that the flow passing out of the sensor tube 2 is not in opposition to the flow in the cooking area.

Figure 2:
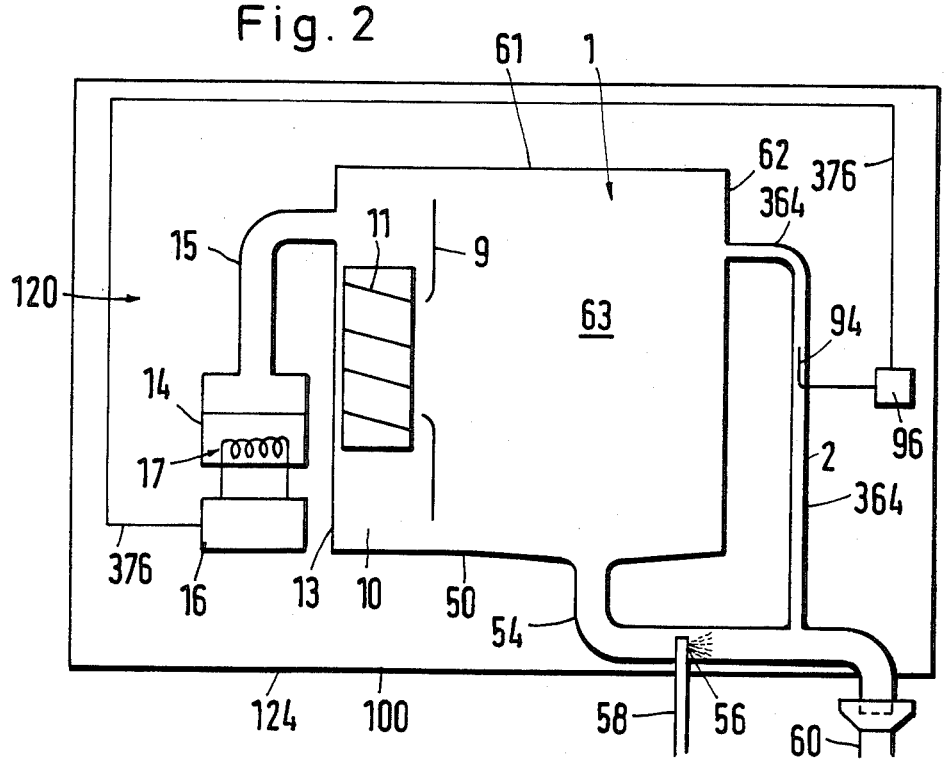
FIG. 2 shows another embodiment of the invention with the sensor tube in the bypass line to the steam trap.

In the embodiment of FIG. 2, the sensor tube 2 with the sensor 7 is arranged in a bypass to steam trap 4. The statements made hereinbefore apply with respect to the alignment of the cooking area opening 5.

In the embodiment shown in FIG. 1, alongside the steam trap 4 is provided a partition 9, which at least partly separates an antechamber or pressure chamber 10 from the cooking area 1. Pressure chamber 10 contains a blower 11, which is surrounded by a heating coil 12.

Behind a partition 13 is arranged a boiler 14 with a steam supply pipe 15 issuing into the pressure chamber 10. A control means 16 provided below boiler 14 is in operative connection with sensor 7, shutoff valve 6 and a boiler heating system 17. The control system 16 is also connected to a water level switch, which is not of interest within the scope of the present invention.

Operationally, the apparatus shown in FIG. 1 is regulated in such a way that in the case of a steam supply to pressure chamber 10 or cooking area 1, shutoff valve 6 is closed until the heat sensor 7 detects a given predetermined temperature of e.g. 95° to 100° C. As a function of this temperature, control system 16 disconnects the boiler heating system 17, so that steam production and steam supply in cooking area 1 is reduced or ended. Simultaneously, control system 16 opens shutoff valve 6, so that as a result of the vacuum then occurring in the cooking area 1, cold ambient air is sucked into the cooking area 1 through the sensor tube 2. As a function of another predetermined temperature which is then indicated by the sensor, shutoff valve 6 is closed again and boiler heating system 17 is reactivated.

Shutoff valve 6 need not necessarily be controlled for opening and closing purposes. When the shutoff valve 6 is constructed as a check valve and is e.g. spring-loaded, opening and closing can also take place automatically. As a function of a given, settable vacuum, the check valve then allows ambient air to flow in and prevents an escape of cooking area atmosphere at a higher pressure.

The following comments provide an explanation in connection with FIGS. 2 to 5. The slightly conically downwardly tapering bottom 50 of cooking area 1 is provided at its lowest point with a drain opening 52 issuing into a discharge pipe 54. The latter extends after a bend below base plate 24 of casing 100 and contains a quenching or extinguishing nozzle 56, which is connected to a water main 58. The opening of nozzle 56 points in the downflow direction and is used for extinguishing steam, which passes out of the cooking area 1 through discharge pipe 54. Behind nozzle 56, discharge pipe 54 ends with a further bend over an outflow line 60.

According to an embodiment of the invention, a measuring tube 64 is fitted in the upper part of a side wall 62 facing chamber 40 and its interior is connected to cooking area 1. Unlike in the representation of FIG. 3, measuring tube 64 can also issue into the rear wall 63 or top 61 of cooking area 1. Measuring tube 64 is constructed as a U-shaped manometer 70, behind which is positioned a sensor 66. The latter can either be a pressure sensor, which detects the pressure in the part 74 sealed off from the liquid column, but the sensor can alternatively have a not shown feeler, which extends into the measuring tube part 74 and which ca be wetted by the liquid of liquid level manometer 70 which may rise in said part 74. Sensor 66 supplies an electrical signal to electrical control line 76 and the amplitude, time or frequency of said signal corresponds to the pressure or height of the liquid column in the measuring tube part 74 detected by the sensor. The electrical control line 76 is simultaneously an input line for a control circuit 16, to whose outputs is connected the filament winding 33. The connection of the control circuit to a power supply system for heating means 34 is not shown.

If when operating the combination steamer according to FIG. 2, the cooking area 1 is completely filled with steam from boiler 14, there is a slight rise in the pressure in cooking area 1. As the measuring tube 64 communicates with the interior of cooking area 1, the liquid manometer 70 responds to the slight pressure increase detected by sensor 66 and is supplied to control circuit 16 in the form of a control signal via control line 76. As a result of the signal received in this way, control circuit 16 reduces the heating capacity of heating means 34, e.g. by reducing the current flow through heating winding 33. Thus, the steam production in boiler 14 is reduced. If the pressure in cooking area 1 drops again to a value which is a sign of an increased steam requirement in cooking area 1, this reduced pressure is detected by sensor 66 and is imparted to cooking circuit 16 by supplying a control signal representing this pressure via control line 76 and said circuit then increases the capacity of heating means 34. As a result of the increased heating of water 32 in boiler 14, more steam is then produced and is supplied via chamber 10 to cooking area 1.

Figure 5:
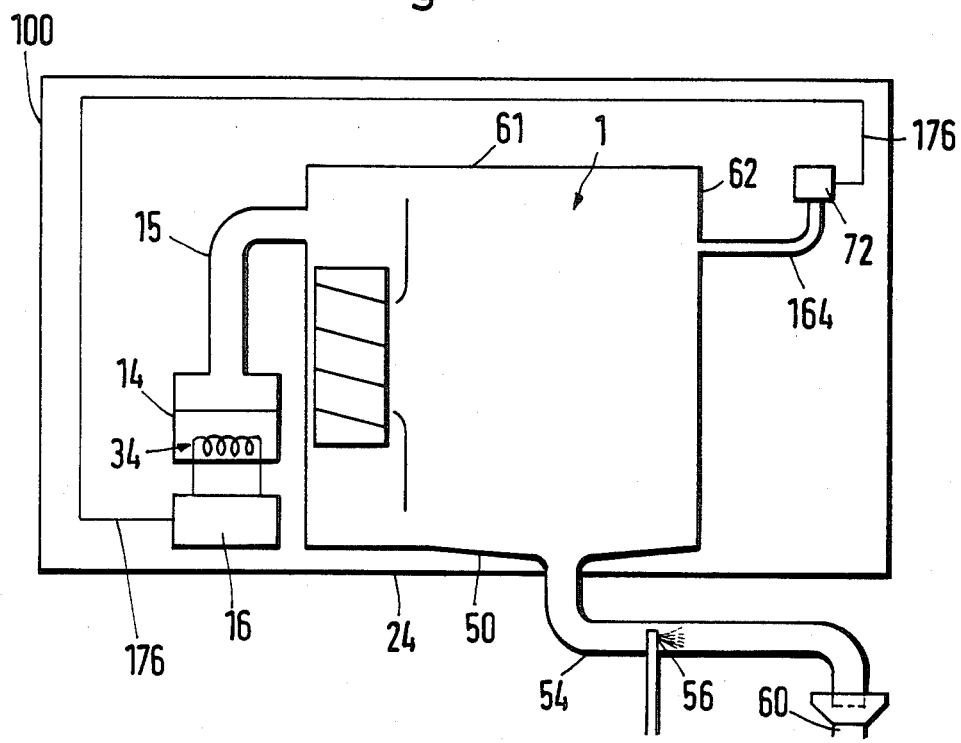
FIG. 5 shows a further embodiment of the invention with the sensor in the form of a pressure pickup.

In the embodiment of the invention according to FIG. 5, a measuring tube 164 is in pressure connection with the interior of cooking area 1 and at the end opposite to the cooking area is terminated by a pressure pickup 72, which is connected via an electrical control line 176 to control circuit 16. The remaining construction and operation of the combination steamer according to this embodiment of the invention is like that of the previously described embodiment. The pressure pickup 72 supplies electrical control signals, whose amplitude, time duration or frequency correspond to the pressures in measuring tube 164 detected by the pressure pickup 72, to the control circuit 16 which modifies the capacity of heating means 34 in accordance with the control signals received.

Figure 4:
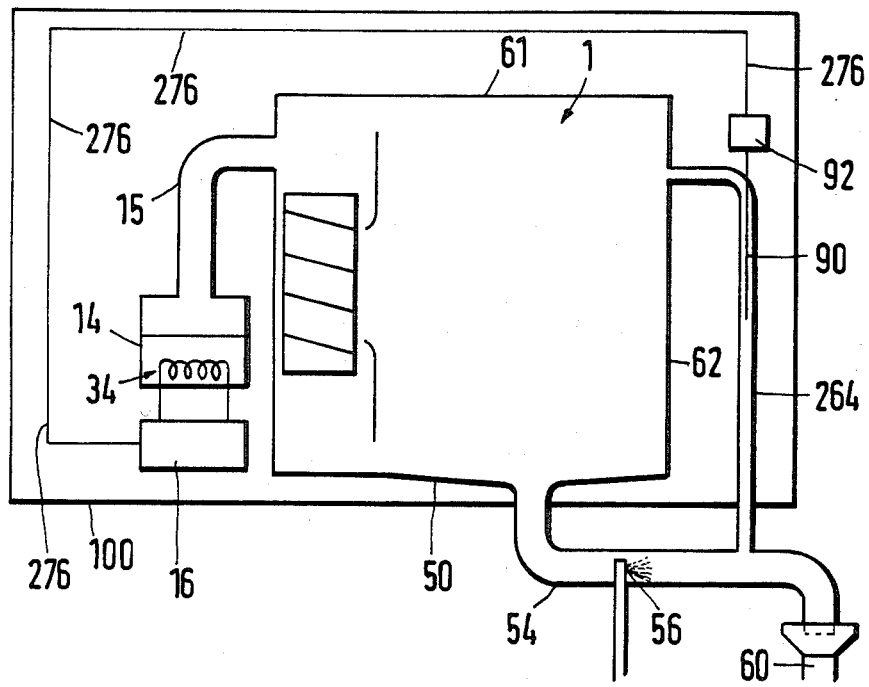
FIG. 4 shows another embodiment of the invention.

The embodiment of the invention according to FIG. 4 differs from the previously described embodiments in that the measuring tube emanates as a bypass line 264 from the upper part of the side wall 62 of cooking area 1 facing controls 120 and issues into discharge pipe 54 in a region thereof located on the downflow side of extinguishing nozzle 56. This construction of the measuring tube makes it possible for the steam, which enters bypass line 264 when cooking area 1 is completely filled with steam to be passed through the same to the outflow line 60, so that an escape of steam into the ambient is prevented.

As shown, a heat sensor 90 connected to a sensor head 92 extends into bypass line 264. On the output side, sensor head 92 is connected via a control line 276 to the control circuit 16.

The heat sensor responds to the temperature rise occurring when steam passes through bypass line 264, so that then the sensor head 92 supplies a control signal corresponding to the temperature rise to control circuit 16. In the case of a temperature reduction detected by the heat sensor, sensor head 92 supplies a corresponding control signal to control circuit 16 via control line 276. The control of the heating capacity of heating means 34 by control circuit 16 takes place as described in connection with the previous embodiments of the invention.

The further embodiment of the invention according to FIG. 2 is similar to the previously described embodiment in that measuring tube 64 is once again in the form of a bypass line 364. From the flow standpoint, bypass line 364 connects cooking area 1 from an upper region of its side wall 62 to the discharge pipe 54 and preferably to the downflow side of the extinguishing nozzle. Within the bypass line 364 is fitted a flow rate meter 94, which e.g. by means of a free-running wheel driven by the flowing medium is able to record the flow rate of the latter, e.g. the steam through a measuring head 96. On the output side, measuring head 96, much as in the previous embodiments of the invention, is connected via control line 386 to the control circuit 16 and via the same supplies output signals corresponding to the flow rates detected by it. It is possible in this way to regulate down the capacity of heating means 34, if an adequate quantity of steam from the steam-filled cooking area 1 flows through bypass line 364 past the flow rate meter 94.

It can be appropriate in the aforementioned embodiments of the invention to incorporate a small restrictor in the discharge pipe 54 on the upflow side of the opening of bypass line 364, said restrictor making it more difficult for the steam to escape from the cooking area via discharge pipe 54.

The invention is not restricted to details of the aforementioned embodiments. Thus, it falls within the scope of the invention, for the measuring tubes 64 or 164, as well as the bypass line 264 or 364 to emanate from the upper region of the rear wall 63 of the cooking area or the top surface 61 thereof.

It is also stated hereinbefore that the measuring tube 64, 164 and bypass lines 264, 364 are to emanate from the upper region of the cooking area wall. However, it has been found, that as a function of the necessary sensitivity of the heating regulation, the measuring tube or bypass line can also emanate from the lower region of the cooking area side or rear wall.

The features of the invention disclosed in the above description, drawings and claims can be essential to the realisation of the invention in its most varied configurations, either individually or in random combinations.

I claim:

1. An apparatus for the heat treatment of foods, particularly for the cooking of meals by means of a steam/hot air mixture flowing into said cooking area in a direction, a steam supply, a temperature sensor for regulating said steam supply, a sensor tube for connecting the cooking area with the ambient and within which the sensor is positioned, and means connected to the cooking area for drainage and discharge, characterized in that there is further provided valve means in said sensor tube (2) positioned between said sensor and ambient so that said sensor is positioned in said sensor tube between said valve means and said cooking area, said valve means constructed to be closed until a predetermined temperature is detected, at which the steam supply is at least reduced, and said valve means constructed to open above the predetermined temperature whereby ambient air is drawn through the sensor tube into said cooking area, the discharge means is spaced from the sensor tube so that said sensor is independent of said discharge means.

2. An apparatus as in claim 1, wherein said valve in said sensor tube (2) is operatively associated with said sensor.

3. An apparatus as in claim 1, wherein the cooking area opening (5) of the sensor tube (2) issues at a small angle with respect to said flow direction.

* * * * *